(12) United States Patent
Boettcher et al.

(10) Patent No.: US 6,959,456 B2
(45) Date of Patent: Nov. 1, 2005

(54) APPARATUS AND METHOD FOR PUTTING ON A PROTECTIVE SUIT

(75) Inventors: Joerg Boettcher, Stuhr (DE); Stephen Ransom, Stuhr (DE); Frank Steinsiek, Bremen (DE)

(73) Assignee: EADS Space Transportation GmbH, Bremen (DE)

( * ) Notice: Subject to any disclaimer, the term of this patent is extended or adjusted under 35 U.S.C. 154(b) by 118 days.

(21) Appl. No.: 10/623,109

(22) Filed: Jul. 17, 2003

(65) Prior Publication Data

US 2004/0055067 A1   Mar. 25, 2004

(30) Foreign Application Priority Data

Jul. 17, 2002   (DE) ............... 102 32 216

(51) Int. Cl.⁷ ........................................... A62B 17/00
(52) U.S. Cl. ................ 2/457; 2/1; 2/2.11; 244/159; 244/161; 49/68
(58) Field of Search ............ 2/2.12, 2.11, 2.14, 2/457, 901, 1; 114/335; 244/159, 158 R, 244/161, 162; 49/68, 483.1; 600/20; 405/189, 405/192, 186, 187; 976/DIG. 337, DIG. 356

(56) References Cited

U.S. PATENT DOCUMENTS

| | | | |
|---|---|---|---|
| 1,777,184 A * | 9/1930 | Stamper | 405/189 |
| 1,822,435 A * | 9/1931 | Facchin | 405/189 |
| 3,146,500 A * | 9/1964 | Volkert | 49/49 |
| 3,386,685 A * | 6/1968 | Judd | 244/162 |
| 3,548,516 A * | 12/1970 | Lanphier et al. | 405/192 |
| 3,675,878 A * | 7/1972 | Von Beckh | 244/162 |
| 4,302,848 A * | 12/1981 | Otsuka et al. | 2/457 |
| 4,485,489 A * | 12/1984 | Pilie et al. | 2/457 |
| 4,828,207 A * | 5/1989 | Haynes | 244/158 R |
| 4,842,224 A | 6/1989 | Cohen | |
| 5,697,108 A * | 12/1997 | Culbertson, Jr. | 2/457 |

FOREIGN PATENT DOCUMENTS

| | | | | |
|---|---|---|---|---|
| FR | 2616413 A1 | * | 12/1988 | B64G 4/00 |
| JP | 02227400 A | * | 9/1990 | B64G 1/38 |

* cited by examiner

Primary Examiner—Rodney M. Lindsey
(74) Attorney, Agent, or Firm—W. F. Fasse; W. G. Fasse

(57) ABSTRACT

A protection suit, particularly a spacesuit, has an opening in a back portion of the spacesuit for entering and exiting the suit. The spacesuit is suspended on one side of a bulkhead (5') so that a hole in the bulkhead is aligned with the opening in the back portion of the suit. The opening is closeable by a backpack (3) which fits through the hole in the bulkhead into a decontamination chamber (7) on the opposite side of the bulkhead. Two sealing and interlocking systems are used. Each system has two subsystems to provide a total of four sealing and interlocking subsystems. A first subsystem (4) connects the spacesuit to the bulkhead that separates a living and working space from an airlock. A second subsystem (6) connects a backpack to the spacesuit (1). A third subsystem (9) connects the spacesuit, preferably through the backpack (3), to a decontamination chamber (7). A fourth subsystem (12) connects the decontamination chamber to the bulkhead (5'). Each subsystem (4, 6, 9, 12) is capable of hermetically sealing and interlocking the respective connection. The decontamination chamber is just large enough to accommodate the backpack.

11 Claims, 2 Drawing Sheets

APPARATUS AND METHOD FOR PUTTING ON A PROTECTIVE SUIT

PRIORITY CLAIM

This application is based on and claims the priority under 35 U.S.C. §119 of German Patent Application 102 32 216.3, filed on Jul. 17, 2002, the entire disclosure of which is incorporated herein by reference.

FIELD OF THE INVENTION

The invention relates to an apparatus for entering a protective suit, particularly a spacesuit for outerspace missions. The invention also relates to a method for putting on the spacesuit.

BACKGROUND INFORMATION

In connection with manned outerspace missions, especially missions for landing on other celestial bodies, such as Mars, there are certain dangers that pose problems to be solved. On the one hand there is the danger of an uncontrolled introduction of terrestrial microorganisms or macroorganisms into the biospheres of other celestial bodies which have not yet been sufficiently explored. On the other hand, it is necessary to prevent an uncontrolled entrance of spurious gases, toxic compounds, and micro-biologic life forms as well as macro-biological life forms into the living areas of the astronauts in order to assure a certain return to earth. This prevention is of particular importance when the astronauts move freely or in vehicles on the surface of the celestial body.

For this purpose it is, for example, provided for manned expeditions to Mars, that the protective suits of the astronauts to be used for the missions on Mars' surface are stored in an accessible protection space or airlock where the suits are to be put on by the astronauts. For this purpose the astronauts leave their living area through a bulkhead and enter into the airlock that is maintained under the same surrounding conditions as their living area. The suits are put on and closed in the airlock and the atmospheric and climatic condition of the airlock are made equal to the surrounding conditions on Mars. Thereafter, the bulkhead leading to the outside is opened and the astronauts exit into the Mars environment. The bulkhead is then closed again, whereby an air flow in the outer bulkhead is intended to prevent the entrance of dust particles. Upon the return of the astronauts to their vehicle it is necessary not only to decontaminate the atmosphere within the airlock, but the protective suits themselves must also be completely decontaminated requiring a high effort and expense. Reference is made in this connection to U.S. Pat. No. 4,842,224 (Cohen) which discloses a suit-port extra-vehicular access facility which leaves room for improvement, particularly with regard to the interlocking and hermetic sealing between certain system components and other system components.

Conventional space suits that have been used in orbit or on the moon are distinguished from one another substantially by two different variants relating to putting on or taking off these suits. Both types of suits, or rather the methods for putting on these suits that will be briefly described below, appear to be suitable in principle for a safe use for the intended purpose.

A first type of spacesuit known by the acronym EMU (Extra Vehicular Mobility Unit) is entered into through the hip section, i.e. the pants or the spacesuit bottom is entered first. The upper portion is then slipped over the astronaut and then connected to the bottom portion. Finally, the helmet is put onto the upper portion and screwed to the upper portion.

The supply of the protective spacesuit generally takes place through hoses that are not disconnectable. These hoses are either directly connected with the supply system of the spacecraft or they are connected with a supply module constructed as a carry-on item or the hoses are connected with a backpack.

A second type of spacesuit known under the acronym ORLAN is put on by entering from the backside through a back flap or opening forming a hatch. This known spacesuit consists of but one piece and is described in the above mentioned U.S. Pat. No. 4,842,224 (Cohen). Once the spacesuit has been entered into, the supply of the spacesuit also takes place through a backpack, whereby the backpack simultaneously hermetically closes the entrance hatch.

OBJECTS OF THE INVENTION

In view of the foregoing it is the aim of the invention to achieve the following objects singly or in combination:

to provide an apparatus for putting on a protective spacesuit of the ORLAN type;

to minimize the volume that needs to be decontaminated after an extra-vehicular activity is completed, while simultaneously maintaining all safety standards that must be unconditionally met for such a mission;

to simultaneously provide a maximum measure of functionality and comfort while minimizing the time needed to enter into such a spacesuit and for decontaminating any components; and to provide a method for putting on a protective spacesuit by using the present apparatus.

SUMMARY OF THE INVENTION

According to the invention the present apparatus is characterized by the following features. An apparatus for entering and exiting a spacesuit in a spacecraft, said spacesuit (1) having a suit, entrance and exit opening (2) in a back portion of said spacesuit, said apparatus comprising a backpack (3) for opening and closing said opening (2) of said spacesuit, said apparatus comprising:

(a) a first sealing and interlocking subsystem operatively interposed between said spacesuit and a bulkhead in said spacecraft for connecting said spacesuit to said bulkhead in an interlocking force transmitting fit, (b) a second sealing and interlocking subsystem operatively interposed between said backpack and said back portion of said spacesuit around said opening for connecting said backpack to said spacesuit in an interlocking and force transmitting fit, (c) a laterally flappable decontamination chamber into which said backpack fits, (d) a third sealing and interlocking subsystem operatively interposed between said spacesuit or backpack and said decontamination chamber for connecting said spacesuit to said decontamination chamber in an isolating manner, and (e) a fourth sealing and interlocking subsystem operatively interposed between said at least one decontamination chamber and said bulkhead in said spacecraft for connecting said decontamination chamber to said bulkhead in an isolating manner.

According to the invention there is also provided a method for putting on such a spacesuit by performing the following steps:

a) using an apparatus as defined in claim 1, b) entering said spacesuit through said opening in said back portion of said spacesuit, c) hermetically sealing said decontamination chamber to said bulkhead by closing said fourth sealing and interlocking subsystem,
d) hermetically sealing said backpack to said back portion of said spacesuit by closing said second sealing and interlocking subsystem,
e) pressurizing said decontamination chamber to a pressure level corresponding to an external pressure level,
f) releasing said backpack from said decontamination chamber by opening said third sealing and locking subsystem,
g) unlocking said first sealing and interlocking subsystem, and
h) releasing said spacesuit from said bulkhead.

Advantages of the invention are seen in that the degree of complexity in putting on such a spacesuit has been substantially reduced. Similarly, the number of steps necessary for putting on such a spacesuit and the number of measures that need to be followed when entering such a spacesuit have been substantially reduced. This advantage is of particular significance for the planning of a manned Mars mission because the mass or weight to be taken along has been partially reduced, while simultaneously increasing the mission's safety. For example, the entire circulating circuit for the treatment of the atmosphere conventionally needed for a necessary airlock, has been obviated while simultaneously substantially improving the sealing and interlocking features between the system components involved in entering and exiting the spacesuit. In connection with the sealing features of the invention a decontamination chamber is an important component of the invention because the present decontamination chamber can be flapped or tilted or swung into the interior of the living and working area of the spacecraft for providing access to the protective spacesuit and in order to reach the inner components of the spacesuit. The backpack of the spacesuit that has been prepared for a mission is stored in the decontamination chamber which only needs to have a size to accommodate the size of the backpack while assuring the required seals.

BRIEF DESCRIPTION OF THE DRAWINGS

In order that the invention may be clearly understood, it will now be described in detail in connection with example embodiments thereof, with reference to the accompanying drawings, wherein.

DETAILED DESCRIPTION OF A PREFERRED EXAMPLE EMBODIMENT AND OF THE BEST MODE OF THE INVENTION

Figure 1:
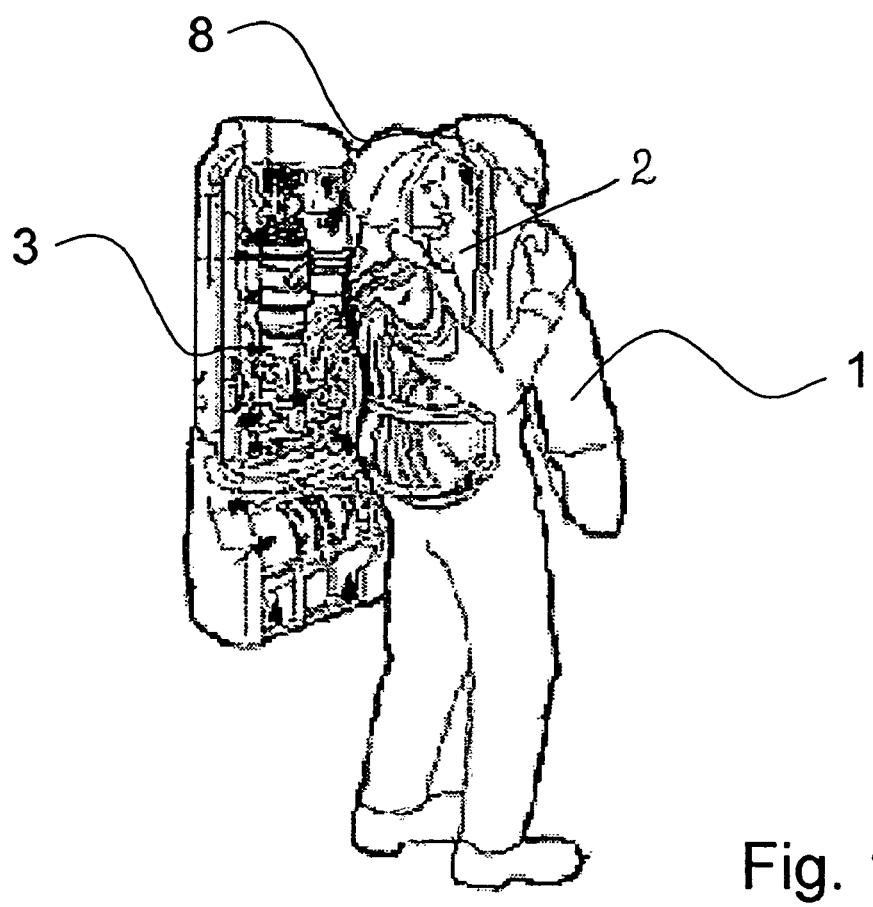
FIG. 1 is a perspective view showing an astronaut entering into the protective spacesuit through a back opening in the rear of the spacesuit.
Figure 3:
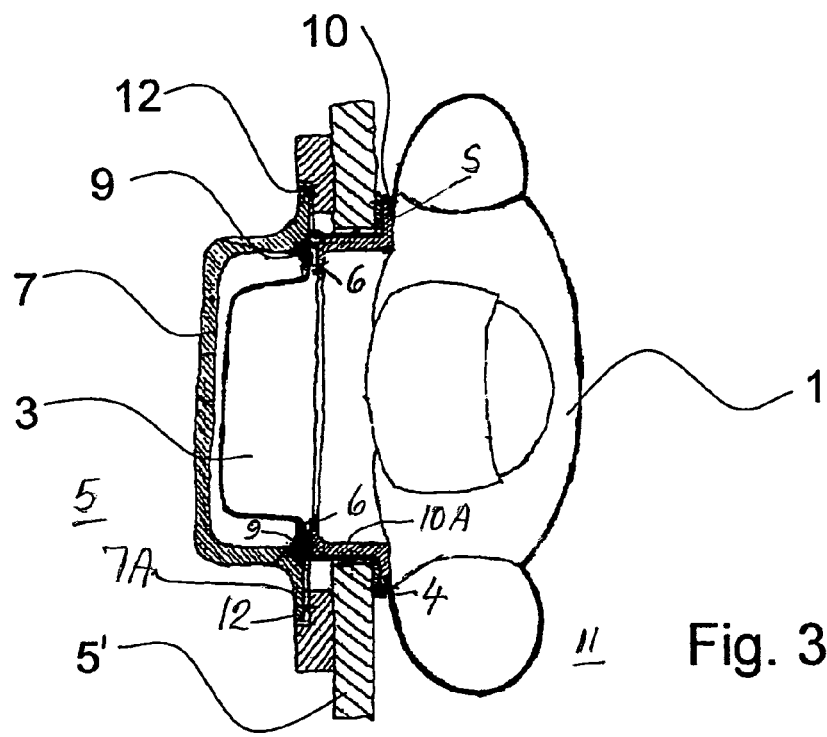
FIG. 3 is a top view in the direction of the arrow III in FIG. 2 and showing, partially in section, a space spacesuit docked to the present apparatus for putting on the space suit.

FIGS. 1 and 3 show a single piece protective spacesuit or spacesuit 1 for use, for example on a Mars mission. This spacesuit 1 corresponds substantially to a conventional spacesuit which, as shown in FIG. 1, has a back opening 2 for entering and exiting the suit. The back opening 2 has, for example, a width of about 600 mm and an opening height of about 1100 mm. The back opening 2 is closed by a backpack 3 which can be tilted or flapped to the side through a hinge H or journal arranged for example on the left side of the back opening thereby avoiding a horizontal motion component. A first two-stage sealing and interlocking subsystem 4, 6 is arranged all around the back opening 2 of the spacesuit 1 for sealing and closing the back opening 2. As shown in FIG. 3, the first sealing and interlocking subsystem 4, 6 comprises a first outer sealing and interlocking subsystem 4 that is connectable in a form locking interference fit and force transmitting manner with a bulkhead or wall 5' of a manned living and working area 5. More specifically, the first subsystem 4 locks and hermetically seals the spacesuit 1 to the bulkhead 5' in a position that aligns the opening 2 of the spacesuit 1 with a hole in the bulkhead 5'.

The first sealing and interlocking system further includes an inner sealing and interlocking subsystem 6 that is connectable in a form locking interference fit and force transmitting manner with the backpack 3 that can be tilted or flapped to a side. The subsystem 6 provides a hermetic seal between the backpack 3 and the spacesuit 1. Preferably, a docking flange 10 is positioned between the subsystems 4 and 6 as will be described below with reference to FIG. 3.

All technical systems necessary for the proper function of the spacesuit 1 are installed in the backpack 3. These technical systems include components including, among others, components of the life sustaining system with an oxygen supply, all components for processing and cleaning of the breathing air, and a temperature and moisture control device, components for a water supply with a water tank, and a water dispenser, components of a waste removal system with a waste water tank and a filter, as well as a waste bag, and components of an energy supply with batteries and an energy distribution system, components for communication and navigation, as well as transmitters, receivers, antennas, and a system for navigation or rather radio direction finding, as well as components for an emergency such as reserve systems including reserve tanks for oxygen and water, as well as an emergency transmitter and an emergency battery.

Figure 2:
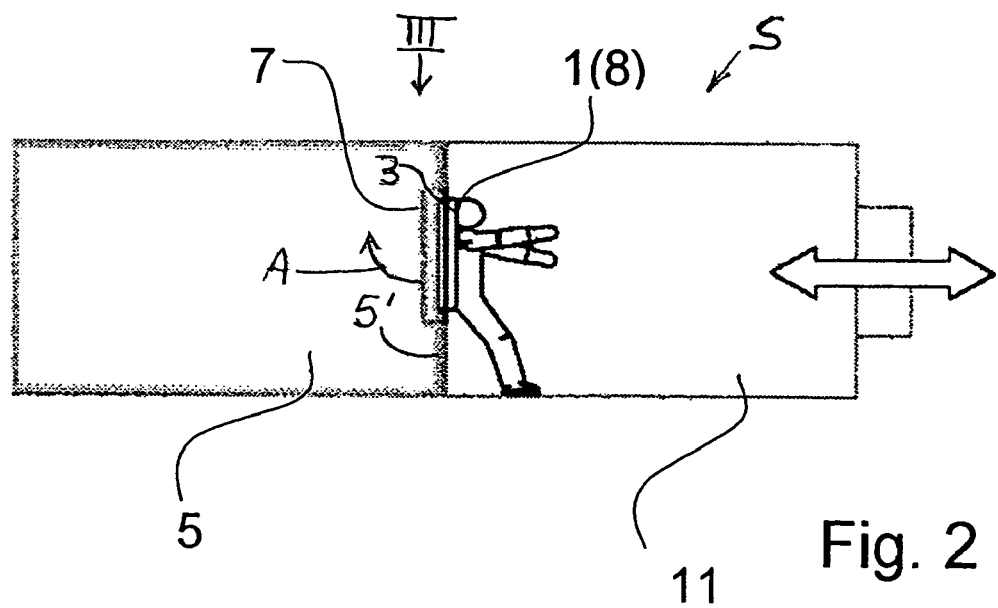
FIG. 2 illustrates schematically a space station with an apparatus for putting on the spacesuit shown docked to a bulkhead separating a living space from an airlock in a spacecraft.

Prior to a mission, the spacesuit 1 is connected as shown schematically in FIG. 2, with the bulkhead 5' of the living and working area 5 through the outer sealing and interlocking subsystem 4. The living and working area 5 is part of a manned station on a celestial body such as Mars. The sealing and interlocking subsystem 4 provides a hermetic seal by the form locking and force transmitting connection. The subsystem 4 serves on the one hand for the sealing and on the other hand for the mounting of the spacesuit 1 to the bulkhead 5. More specifically, the subsystem 4 provides a suspension of the spacesuit 1 on the airlock side of the bulkhead 5' opposite to the living and working area 5. The subsystem 4 takes up, in addition to the static weight force, the forces and moments that occur additionally when the astronaut enters or exits the spacesuit. As shown in FIG. 3 a specially constructed docking flange 10 assures a precise guiding and a snug fit around the hole in the bulkhead 5' to provide the intended hermetic seal between the spacesuit 1 and the living area 5 to seal the airlock 11 from the area 5. Such hermetic seal must be realized repeatedly, namely for each use of the spacesuit.

The closure and interlocking is achieved by means of clamps which, upon reaching the correct position, automatically engage to provide a form locking interference fit and force transmitting connection. Due to the integrated sealing, a complete hermetical separation between the conditions of the Mars environment and the conditions of the living and working area 5 is assured. When an astronaut exits from the spacesuit an automatic opening of the clamps takes place. This automatic opening is achieved either through a signal given by the astronaut inside the spacesuit, or by a signal given by an accompanying mission crew member in the living and working area 5.

Figure 4:
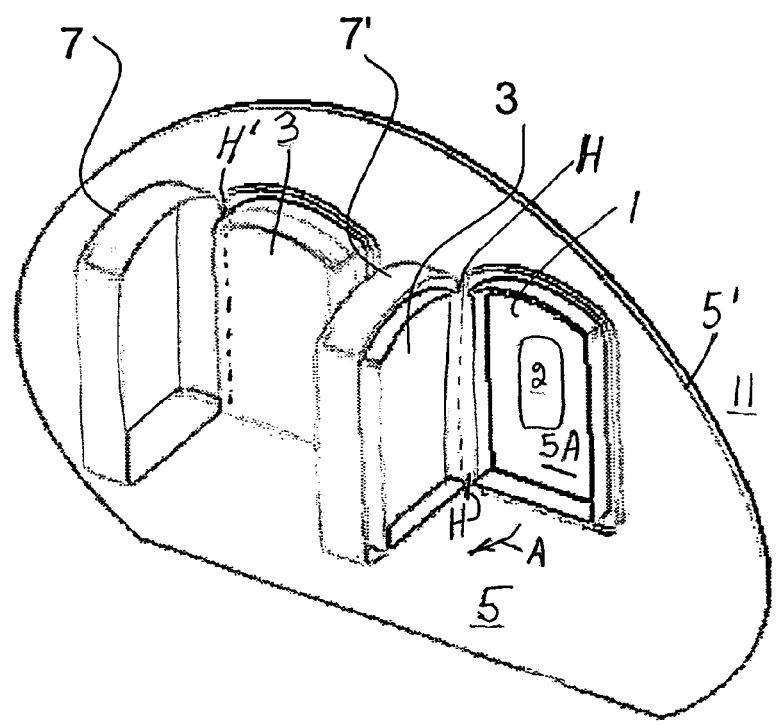
FIG. 4 is a perspective detail illustration of an arrangement according to FIG. 2 with two decontamination chambers for entering or exiting a spacesuit.

The living and working area 5 is the central and most important infrastructure of the manned space, e.g. Mars mission on Mars' surface. All facilities for living, working, and in an emergency for surviving, are concentrated in the area 5. Common rooms, sleeping areas, a kitchen, sanitary cells, laboratories, and the mission center are accommodated in the area 5. Preferably, several docking stations are arranged next to each other on the bulkhead 5' between the working area 5 and the airlock or protection sluice 11 for docking several spacesuits 1 as shown in FIG. 4 to be described in more detail below. The surface missions are prepared, started in these docking stations. Upon completion of a surface mission, the follow-up processing is also performed in these docking stations. This follow-up processing includes primarily the maintenance of the spacesuits, including visual inspections, measurements of the seal effectiveness, charging of the batteries, refilling of the gas and water pressure bottles, as well as emptying the waste water and waste container.

In order to assure the safety of a mission, at least one, preferably more, decontamination chambers 7, 7' are provided within the living area 5 as shown in FIG. 4. These decontamination chambers have a housing with a flange 7A functioning also as a door insulated by a second two-stage sealing and interlocking system relative to the spacesuit 1 or backpack 3 and relative to the living area 5. An internal sealing and interlocking subsystem 9 and an external sealing and interlocking subsystem 12 serve for this purpose. Both subsystems 9 and 12 form the second two-stage sealing and interlocking system and provide a form locking, force transmitting connection with the respective structure, namely the living area 5 to which the subsystem 12 is connected, and the backpack 3 to which the subsystem 9 is connectable. The subsystem 9 is referred to as a third subsystem while the subsystem 12 is referred to as a fourth subsystem relative to the first subsystem 4 and the second subsystem 6, described above.

The backpack 3 of the spacesuit 1 that has been prepared for a mission, is located within the decontamination chamber 7 which will be tilted or flapped into the inner space of the living and working area 5 in order to facilitate the access into the spacesuit 1. Flapping the backpack sideways also provides access to the inner components of the spacesuit. The size of the decontamination chamber 7 is determined by the size of the backpack 3.

It is the primary purpose of the decontamination chambers 7, 7' to hermetically seal the outer portion of the tiltable backpack 3 hermetically relative to the inside of the living and working area 5. If it is necessary the decontamination chambers 7, 7' also serve for decontaminating the backpack while simultaneously permitting the entrance into the spacesuit 1 providing access to the backpack components. Another important purpose of the decontamination chambers is the closing and sealing of the hole 5A in the bulkhead 5' of the living area 5 when the spacesuit 1 has been released from the bulkhead 5', whereby the backpack is released from the hole and the latter is closed by the respective decontamination chamber 7, 7'.

FIG. 4 shows the living and working area 5 in front of the bulkhead 5' and the airlock 11 behind the bulkhead 5'. Two spacesuit docking stations are arranged next to one another in the bulkhead 5'. Each docking station includes a decontamination chamber 7, 7'. Each chamber 7, 7' has a housing that is tiltable or flappable open into the area 5 with the aid of a hinge H. Preferably, the housing of the decontamination chamber 7 and the backpack 3 have separate hinges H and H' for tilting or flapping the housing and the backpack 3 separately or in unison. The left hand decontamination chamber 7 is shown in an open position with the backpack 3 still in a hole 5A in the bulkhead 5'. The decontamination chambers 7, 7' are normally open only when the chamber itself is to be inspected from the inside or the backpack 3 is to be inspected from the outside and when maintenance work is to be done for the chambers 7, 7' and/or for the backpacks 3.

The decontamination chamber 7' shown on the right hand side of FIG. 4 has been tilted into the living area 5 in the direction of the arrow A, with the backpack 3 inside the decontamination chamber 7'. The spacesuit 1 is now accessible through the hole 5A in the bulkhead 5' and through the opening 2 in the back of the spacesuit 1. Thus, the right hand illustration in FIG. 4 shows the normal position prior to entering the spacesuit 1 or just after exiting from the spacesuit 1 and during preparation phases for a mission.

The isolation of the backpack 3 relative to the living area 5 is assured by the above mentioned internal sealing and locking subsystem 9 forming the third subsystem seen in FIG. 3. The sealing of the opening 5A into the living area 5, that is the opening of the docking station through the bulkhead is achieved by the external sealing and locking subsystem 12 forming the fourth subsystem. This system is generally closed during an extra-vehicular activity and remains generally also closed during prolonged rest phases for safety reasons. An opening of a docking station by tilting or flapping in the direction of the arrow A, which provides access to the inside of the backpack 3 and the inside of the spacesuit 1 through the hole 5A and the opening 2 is performed only immediately prior to an extra-vehicular activity in preparation of such an activity. The accessibility to the spacesuit 1 and to the interior of the backpack 3 is made possible by flapping the decontamination chamber 7, 7' and the backpack 3 in the direction of the arrow A about the hinge H for a minimum of 90°. The sealing and locking subsystem 9 between the backpack 3 and the decontamination chamber 7 remains normally closed.

A decontamination that needs to be performed for safety purposes on the components that reach into the living area 5, particularly the backpack 3, is performed by a sequence of measures or steps. These measures or steps include chemical and physical processes or reactions. For example, pressurized air and protective gases are used for this purpose, as well as rinsing with water, acids, and/or lye solutions, as well as by heating, cooling, and evacuating.

A window not shown but positioned in the back wall of the housing of the decontamination chamber 7, 7' permits a visual inspection of the outer surface of the backpack 3 when the backpack 3 is stored in the housing of the decontamination chamber 7, 7'. During extra-vehicular activities when the backpack 3 and spacesuit 1 are removed from the decontamination chamber 7, 7' such a window in the back wall of the housing of the decontamination chamber provides a view into an additionally provided external protection space 11 also referred to as airlock 11 shown in FIG. 2.

Normally, the decontamination chamber 7, 7' is closed, whereby the decontamination chamber or rather its housing closes the living and working area 5 hermetically in a form locking and force transmitting manner relative to the environment on Mars. Thus the housing of the decontamination chamber 7, 7' also functions as part of the bulkhead 5'.

The backpack 3 and the housing of the decontamination chamber 7, 7' may be tilted or flapped into the open position after the seal between the spacesuit 1 and the first subsystem 4 and the seal between the decontamination chamber and the third subsystem 9 have been checked. This tilting is possible after the fourth sealing and locking subsystem 12 has been unlocked. The opening 2 forming the entrance into the spacesuit 1 now becomes accessible by the above-mentioned tilting of the decontamination chamber 7, 7' into the living area 5. The backpack 3 of the surface spacesuit 1 is sealed hermetically to the decontamination chamber 7 or 7' by the sealing and locking subsystem 9 which remains closed. Simultaneously, the free accessibility of the components mounted inside the backpack 3 is assured.

The astronaut 8 enters the spacesuit 1 through the opening 2 after the operating status of all components of the spacesuit 1 have been checked, followed by a final visual and manual verification. In preparation for climbing into the spacesuit, the astronaut holds himself on lateral handles, not shown, and then slides his feet and legs through the opening 2 into the spacesuit 1. The astronaut's head is the last part that assumes the predetermined position within the spacesuit 1, whereupon the back opening 2 of the spacesuit 1 can be closed by the second subsystem 6. The closing of the spacesuit is performed in two sequential steps. First, the decontamination chamber 7 is connected in a hermetically sealed manner with the bulkhead 5' of the living area 5 through the fourth sealing and locking subsystem 12. Between the first and the second step a check is made whether the connection between the housing of the decontamination chamber 7 and the living area 5 is properly sealed by the subsystem 12. This test is made as a rule with a pressure measurement. When the pressure measurement indicates a proper seal the second step is performed in which the backpack 3 positioned inside the chamber 7, is hermetically closed by its internal sealing and locking subsystem 6 with the back portion of the spacesuit 1, preferably through the docking flange 10 which has a ring portion, fits into the hole 5A in the bulkhead 5'. A seal S is provided between the edge of the hole 5A and the radially outer surface of the ring portion 10A of the docking flange 10 which has a radially outwardly extending flange section between the spacesuit 1 and the bulkhead 5', and a radially inwardly extending flange section between the backpack 3 and the ring portion 10A.

Finally, the proper sealing of all connections or subsystems 4, 6, 9 and 12 is tested. During this test the pressure characteristic of the decontamination chamber 7 is checked whether it is below the normal pressure prevailing in the living area 5. Additionally, the internal pressure of the airlock 11 is measured. If no pressure increase occurs, then the outer sealing of the first subsystem 4, the internal sealing of the second subsystem 6, the sealing of the third subsystem 9 between the backpack 3 and the decontamination chamber 7, and the sealing of the fourth external subsystem 12 between the living area 5 and the chamber 7 are in good order. A measurement of the pressure inside the spacesuit 1 further double-checks the proper seal between the spacesuit 1 and the second subsystem 6 to the backpack 3.

Now the inside of the decontamination chamber 7 can be brought to the atmospheric pressure on Mars, which depends on the time of day and on the season of the year. However, an increased pressure kept at the atmospheric pressure on earth can thereby help in separating the spacesuit 1 out of its holding bracket that forms part of the first subsystem 4. In this procedure the backpack 3 is first released from the decompression chamber 7 by opening or unlocking the sealing and locking third subsystem 9. Only then is the outer sealing and locking subsystem 4 unlocked. The operation is completed with the release of the spacesuit 1 from the bulkhead 5' of the living area 5.

The astronaut 8 can now move freely within the possibilities of the spacesuit 1 and in accordance with the environmental conditions and mission requirements on Mars' surface for performing the intended mission. The first steps are generally taken in the protected airlock 11 which also serves as a storing space for the spacesuits 1 during rest phases. This space can have the shape of a tent, a container, or the like, and it will be equipped in accordance with the purposes of the mission. Thus, the space 11 can be a storage for supply goods, as well as for objects to be investigated or as a field laboratory for investigating of samples. The door D to Mars' environment merely has the function to keep out as much dust as possible.

At the end of the mission the astronaut 8 again approaches the living and working area 5 in the spacesuit 1. Generally, the astronaut will enter the airlock 11 in which the mountings for the spacesuits 1 are located. To get out of the spacesuit 1, the astronaut turns his back toward the free, opened decontamination chamber 7 and latches himself with the outer sealing and locking subsystem 4 into the corresponding counterpart of the living and working area 5. Prior to the form locking and force transmitting closure of the connection, the sealing areas need to be cleaned of dust and other solid particles. This can be accomplished through compressed air or vacuum cleaners and/or through suitable wipes.

The astronaut now is suspended in its spacesuit 1 on the modular bulkhead 5'. Now follows an automatic operation in which following the proper closing of the outer locking subsystem 4, the locking subsystem 9 between the backpack 3 and the decontamination chamber 7 is closed. Only following a seal test which involves primarily the checking of the sealing and locking subsystems 4, 6, 9 and 12, is it possible to open the spacesuit 1. The opening of the spacesuit 1 is started with the sequential unlocking of the locking systems 6 and 9. The backpack 3 is finally flapped or tilted into the open position together with the housing of the decontamination chamber 7 into the area 5. The backwards facing opening 2 of the spacesuit becomes now freely accessible. The astronaut can now leave the confines of the spacesuit 1 and enter into the living and working area 5. The astronaut leaves the spacesuit 1 by first extending his head and arms out of the spacesuit and thereafter grasps handles, not shown, in order to pull himself out of the spacesuit 1.

Independently of the astronauts leaving the spacesuit 1, the backpack 3 can now be decontaminated in the decontamination chamber 7. This decontamination procedure comprises as a rule the above mentioned physical and chemical measures such as the rinsing with solutions and acids, heating, drying, vacuum cleaning and so forth. These procedures are followed by measurements made with biosensors and with particle measuring equipment. If no extraneous matter is detected, the backpack 3 can be taken off and if necessary, brought for repairing inside the living and working area 5. For normal maintenance work it is not necessary to take the backpack off the spacesuit 1. The backpack 3 remains to the beginning of the next mission either flapped open or connected with the back of the spacesuit 1 in the hermetically sealed environment of the decontamination chamber 7, 7'.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for entering and exiting a spacesuit in a spacecraft, said spacesuit (1) having a spacesuit entrance and exit opening (2) in a back portion of said spacesuit and a backpack (3) for opening and closing said opening (2) of said spacesuit, said apparatus comprising:
   a) a first sealing and interlocking subsystem (4) operatively interposed between said spacesuit (1) and a bulkhead (5') in said spacecraft (S) for connecting said spacesuit (1) to said bulkhead (5') in an interlocking force transmitting fit,
   b) a second sealing and interlocking subsystem (6) operatively interposed between said backpack (3) and said back portion of said spacesuit (1) around said opening (2) for connecting said backpack (3) to said spacesuit (1) in an interlocking and force transmitting fit,
   c) a laterally flappable decontamination chamber (7) into which said backpack (3) fits,
   d) a third sealing and interlocking subsystem (9) operatively interposed between said spacesuit (1) or backpack (3) and said decontamination chamber (7) for connecting said spacesuit to said decontamination chamber (7) in an isolating manner,
   e) a fourth sealing and interlocking subsystem (12) operatively interposed between said at least one decontamination chamber (7) and said bulkhead (5') in said spacecraft for connecting said decontamination chamber (7) to said bulkhead (5') in an isolating manner,
   f) a first hinge (H) between said bulkhead (5') and said decontamination chamber (7) for opening and closing a hole (5A) in said bulkhead (5') by laterally flapping said decontamination chamber (7) into an open position or back into a closed position, and
   g) a second hinge (H') operatively connecting said backpack (3) for tilting said backpack (3) with said decontamination chamber (7) laterally away from said bulkhead (5') in unison with said decontamination chamber (7) or tilting said backpack (3) separately from said decontamination chamber (7).

2. The apparatus of claim 1, wherein said first sealing and interlocking subsystem (4) is arranged radially outwardly of said entrance and exiting opening (2) and wherein said second sealing and interlocking subsystem (6) is arranged radially inwardly of said first sealing and locking subsystem.

3. The apparatus of claim 1, wherein said laterally flappable decontamination chamber comprises an open side surrounded by a chamber flange (7A), and wherein said third sealing and locking subsystem (9) is arranged radially inwardly of said chamber flange (7A) for connecting said backpack (3) of said spacesuit to said decontamination chamber (7) with an interlocking, force transmitting fit.

4. The apparatus of claim 3, wherein said fourth sealing and locking subsystem (12) is arranged radially outwardly of said chamber flange (7A) for connecting said decontamination chamber (7) to said bulkhead (5') with an interlocking force transmitting fit.

5. The apparatus of claim 1, further comprising a docking flange (10) framing said hole (5A) in said bulkhead (5').

6. The apparatus of claim 5, wherein said first sealing and locking subsystem (4) surrounds said docking flange (10) radially outwardly of said docking flange (10).

7. The apparatus of claim 5, wherein said second sealing and locking subsystem (6) is positioned radially inwardly of said docking flange (10).

8. The apparatus of claim 5, wherein said docking flange (10) comprises a ring portion (10A), a radially outwardly extending flange portion connected to said ring portion (10A) and facing said spacesuit (1), and a radially inwardly extending flange portion connected to said ring portion and facing said backpack (3).

9. The apparatus of claim 5, further comprising a seal (S) between said docking flange (10) and a rim of said hole (5A) in said bulkhead (5').

10. The apparatus of claim 1, wherein said bulkhead (5') separates a living and working area (5) from an airlock or protective sluice (11).

11. The apparatus of claim 1, wherein said decontamination chamber (7) forms a door for said hole (5A) in said bulkhead (5').

* * * * *